United States Patent
Nishiji

[11] Patent Number: 6,066,064
[45] Date of Patent: May 23, 2000

[54] PARALLEL-AXIS COMBINATION DIFFERENTIAL GEAR UNIT

[75] Inventor: Makoto Nishiji, Brussels, Belgium

[73] Assignee: Zexel Corporation, Japan

[21] Appl. No.: 09/261,905

[22] Filed: Mar. 3, 1999

[30] Foreign Application Priority Data

Mar. 6, 1998 [JP] Japan .................................. 10-073397

[51] Int. Cl.[7] .................................................. F16H 48/22
[52] U.S. Cl. .......................... 475/248; 475/230; 475/252
[58] Field of Search ................................... 475/248, 249, 475/252, 230

[56] References Cited

U.S. PATENT DOCUMENTS

| | | |
|---|---|---|
| 2,269,734 | 1/1942 | Powell . |
| 3,251,244 | 5/1966 | Nickell . |
| 4,245,524 | 1/1981 | Dammon . |
| 4,535,651 | 8/1985 | Chambers ............................... 475/252 |
| 4,969,532 | 11/1990 | Oyama et al. . |
| 4,978,329 | 12/1990 | Yasui et al. . |
| 5,055,096 | 10/1991 | Riemscheid et al. . |
| 5,183,446 | 2/1993 | Hughes . |
| 5,194,058 | 3/1993 | Amborn et al. . |
| 5,215,506 | 6/1993 | Hara . |
| 5,292,291 | 3/1994 | Ostertag ................................. 475/252 |
| 5,295,922 | 3/1994 | Amborn et al. . |
| 5,302,159 | 4/1994 | Dye et al. . |
| 5,389,048 | 2/1995 | Carlson . |
| 5,415,601 | 5/1995 | Cilano . |
| 5,433,673 | 7/1995 | Cilano .................................... 475/252 |
| 5,492,510 | 2/1996 | Bowerman . |
| 5,554,081 | 9/1996 | Bowerman . |
| 5,624,344 | 4/1997 | Yehl et al. ............................... 475/160 |
| 5,647,815 | 7/1997 | Bowerman et al. .................... 475/249 |
| 5,730,679 | 3/1998 | Ichiki ...................................... 475/252 |
| 5,733,216 | 3/1998 | Bowerman .............................. 475/252 |
| 5,842,946 | 12/1998 | Ichiki ...................................... 475/252 |

FOREIGN PATENT DOCUMENTS

| | | |
|---|---|---|
| 0 563 895 | 6/1993 | European Pat. Off. . |
| 2 615 262 | 11/1988 | France . |
| 40 23 332 | 3/1992 | Germany . |
| 40 27 423 | 10/1998 | Germany . |
| 5-209660 | 8/1993 | Japan . |
| 5-296304 | 9/1993 | Japan . |
| 6-16750 | 3/1994 | Japan . |
| 08135759 | 5/1996 | Japan . |
| 08226525 | 9/1996 | Japan . |
| 09144839 | 6/1997 | Japan . |
| WO 93/02301 | 2/1993 | WIPO . |

*Primary Examiner*—Khoi Q. Ta
*Attorney, Agent, or Firm*—Eugene Stephen & Associates

[57] ABSTRACT

Paired planetary gears 3A, 3B are each provided on one end thereof with a long gear portion 31, on the other end with a short gear portion 32, and a neck portion 33 between the long gear portion 31 and the short gear portion 32. The long gear portion 31 of the planetary gear 3A is in engagement with the short gear portion 32 of the other planetary gear 3B at an inner gear portion 31b and with a gear portion 2a of a side gear 2A at an outer gear portion 31a. The long gear portion 31 of the other planetary gear 3B is in engagement with the short gear portion 32 of the planetary gear 3A at the inner gear portion 31b and with a gear portion 2b of a side gear 2B at the outer gear portion 31a.

7 Claims, 5 Drawing Sheets

PARALLEL-AXIS COMBINATION DIFFERENTIAL GEAR UNIT

TECHNICAL FIELD

This invention relates to a parallel-axis combination differential gear unit having planetary gears arranged in parallel to a rotational axis of a housing.

BACKGROUND OF THE INVENTION

The parallel-axis combination differential gear unit, as shown in FIG. 9, includes a housing (not shown) driven for rotation about a rotational axis L, a pair of side gears S1, S2 rotatably supported within the housing with their axes aligned with each other and coaxial with the rotational axis L, and at least one pair of planetary gears P1, P2 rotatably disposed within the housing in parallel to the rotational axis L. Each of the planetary gears P1, P2 is provided on one end portion thereof with a long gear portion (first gear portion) Pa, on the other end portion thereof with a short gear portion (second gear portion) Pb, and on an intermediate portion thereof with a neck portion Pc having a smaller diameter than the gear portions Pa, Pb. The long gear portion Pa of the planetary gear P1 is in engagement at its inner portion Pa1 with the side gear S1 and at its outer portion Pa2 with the short gear portion Pb of the planetary gear P2. The long gear portion Pa of the planetary gear P2 is in engagement at its inner portion Pa1 with the side gear S2 and at its outer portion Pa2 with the short gear portion Pb of the planetary gear P1 (see WO 93/02301).

In some arrangements of the parallel-axis combination differential gear unit, a plurality of washers, spacers, or the like is arranged between the side gear S1 and the side gear S2. For example, in an arrangement discussed in U.S. Pat. No. 5,389,048, spacer blocks are arranged between a pair of side gears. In such an arrangement, it becomes necessary to enlarge the space between the side gears S1, S2 to the extent of a space occupied by the spacer blocks. To fulfill this requirement, the neck portions Pc of the planetary gears P1, P2 are increased in lengthwise dimension.

However, if the lengthwise dimension of the neck portions Pc of the planetary gears P1, P2 is increased, it gives rise to a problem that the planetary gears P1, P2 are reduced in physical strength. In particular, the neck portion Pc is reduced in torsion strength.

SUMMARY OF THE INVENTION

It is, therefore, an object of the present invention to provide a parallel-axis combination differential gear unit in which a space between a pair of side gears can be enlarged without sacrificing the physical strength of the planetary gears so that a plurality of washers, spacer blocks, or the like can be arranged between the side gears.

To achieve this object, according to a first version of the invention, a parallel-axis combination differential gear unit comprises (a) a housing driven for rotation about a rotational axis, (b) a pair of side gears rotatably supported by the housing with axes thereof aligned with each other and coaxial with the rotational axis, and (c) at least one pair of planetary gears rotatably supported by the housing in parallel relation to the rotational axis. Each of the planetary gears is provided on opposite ends thereof with a first and a second gear portion and on an intermediate portion thereof with a neck portion that is smaller in diameter than the first and second gear portions. The first gear portion of each planetary gear is in engagement with a gear portion of one of the pair of side gears and also with the second gear portion of the other planetary gear. The gear portions of the pair of side gears are at least partly in engagement with the first gear portions of the planetary gears in axial regions located outwardly of an engaging region between the first and second gear portions of the planetary gears.

In the above version of the invention, it is preferred that the gear portions, as a whole, of each side gear are in engagement with the first gear portion of the planetary gears along an axial region located outwardly of the engaging portion between the first and second gear portions of the planetary gears.

It is also preferred that (a) the second gear portion of each planetary gear is in engagement at an intermediate portion thereof with the first gear portion of the other planetary gear and (b) the one pair of side gears each include an inner gear portion and an outer gear portion on opposite end portions thereof. The inner gear portion of the side gears is in engagement with the first gear portion of the planet gears along axial regions located inwardly of an engaging portion between the first and second gear portions of the planet gears. The outer gear portion of the side gears is in engagement with the first gear portion of the planet gears along an axial region located outwardly of the engaging portion between the first and second gear portions of the planetary gears.

The pair of side gears may be the same or different in outer diameter. For example, according to a second version of the invention, a parallel-axis combination differential gear unit comprises (a) a housing driven for rotation about a rotational axis, (b) a pair of side gears rotatably supported by the housing with axes thereof aligned with each other and coaxial with the rotational axis, and (c) at least one pair of planetary gears rotatably supported by the housing in parallel with the rotational axis. Each of the planetary gears is provided on opposite ends thereof with a first and a second gear portion and on an intermediate portion thereof with a neck portion that is smaller in diameter than the first and second gear portions. The first gear portion of each planetary gear is in engagement with one of the side gears and also with the second gear portion of the other planetary gear. The two side gears have different outside diameters. The first gear portion of one of the planetary gears is in engagement with the second gear portion of the other planetary gear at an inner end portion thereof and also with the larger diameter side gear at an outer end portion thereof.

In the second embodiment, it is preferred that the side gear having a reduced diameter is in engagement with the first gear portion of the other planetary gear at the outer end portion.

According to a third version of the invention, a parallel-axis combination differential gear unit comprises (a) a housing driven for rotation about a rotational axis, (b) one pair of side gears rotatably supported by the housing with an axis thereof aligned with each other and coaxial with the rotational axis, and (c) at least one pair of planetary gears rotatably supported by the housing in parallel relation to the rotational axis. The one pair of planetary gears is in engagement with the one pair of side gears and also with each other. The side gears of the pair have different outside diameters. One of the paired planetary gears is provided on opposite end portions thereof with a first and a second gear portion and on an intermediate portion thereof with a neck portion that is smaller in diameter than the first and second gear portions. The first gear portion is in engagement with the larger diameter side gear, the second gear portion is in engagement with the other planetary gear, and the other planetary gear is in engagement with the smaller diameter side gear.

DETAILED DESCRIPTION

Several embodiments of the present invention will now be described with reference to FIGS. 1 to 8.

Figure 1:
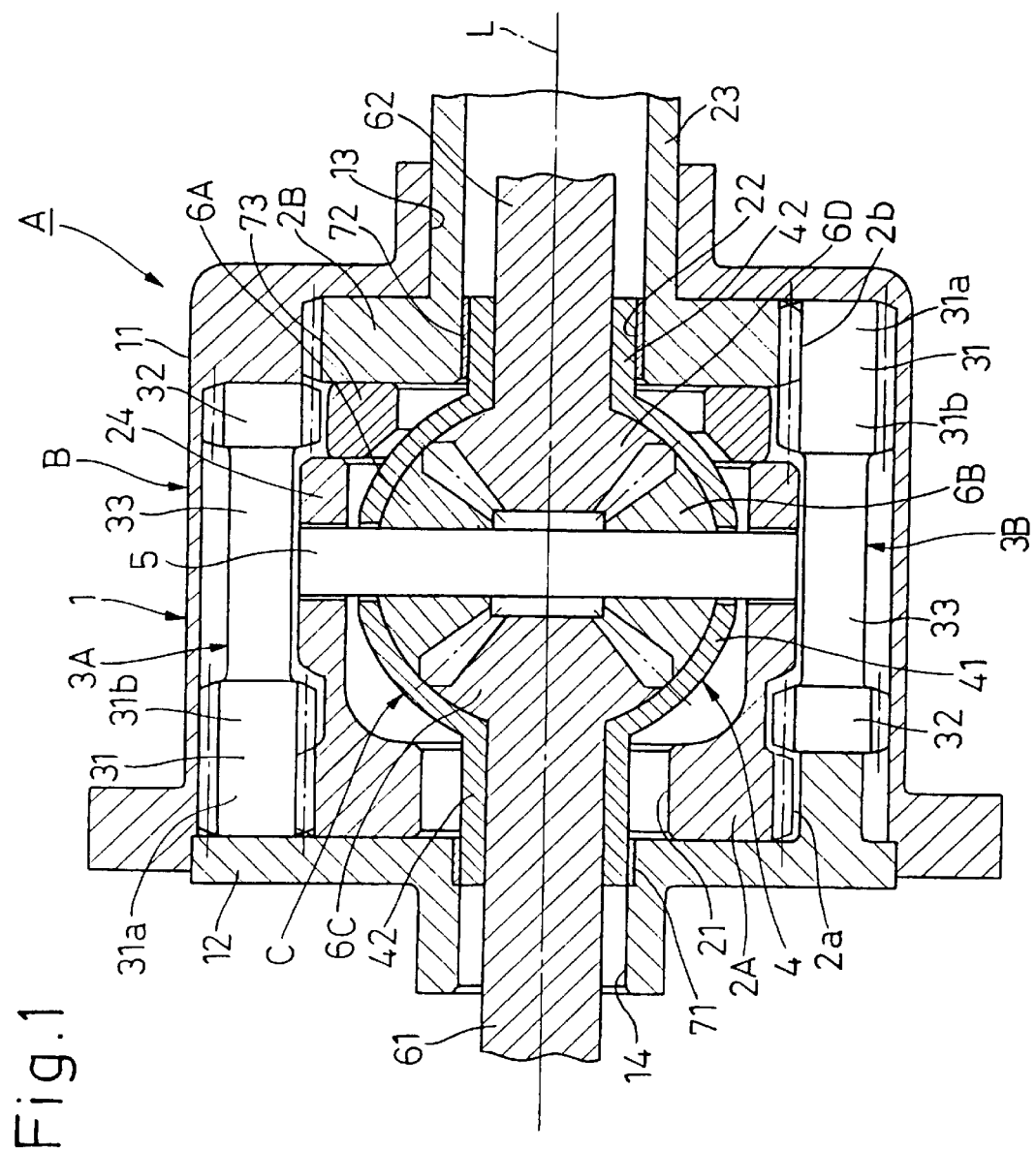
FIG. 1 is a sectional view showing the first embodiment of the first version of the invention.

FIG. 1 shows the first embodiment of the first invention. A parallel-axis combination differential gear unit A of this embodiment is suitably used as (a) a center differential and a rear differential or (b) a center differential and a front differential of a four-wheel drive vehicle. The differential gear unit A comprises a parallel-axis combination differential gear mechanism portion B and a differential gear mechanism portion C called an "open differential" which is disposed within the mechanism portion B.

The parallel-axis combination differential gear mechanism portion B will be described first. This parallel-axis combination differential gear mechanism portion B includes a housing 1 for housing the overall parallel-axis combination differential gear unit A. The housing 1 comprises a cylindrical body portion 11 having a bottom and a closure member 12 for closing an opening portion at one end (left end in FIG. 1) of the body portion 11. The closure member 12 is fixedly bolted (not shown) to the body portion 11. The housing 1 is driven for rotation about a rotational axis L by an engine (not shown).

One pair of side gears 2A, 2B are rotatably arranged within the housing 1 at one end portion (left end portion in FIG. 1) and the other end portion, respectively, with their axes aligned with each other and coaxial with the rotational axis L. The side gears 2A, 2B are formed at central portions thereof with through-holes 21, 22, respectively, extending on the rotational axis L. The side gear 2A is provided on its outer end portion with a gear portion 2a and on its inner end portion with a supporting sleeve portion 24 having an annular configuration in axial section. The side gear 2A is supported by the housing 1 through planetary gears 3A as later described. The side gear 2B is provided on its inner end portion with a gear portion 2b and on its outer end portion with an output sleeve portion 23. The output sleeve portion 23 is rotatably fitted into a support hole 13 formed in the body portion 11, whereby the output sleeve portion 23 is rotatably supported by the housing 1. The output sleeve portion 23 is connected as an input shaft to the rear differential in case the differential gear unit A is used as the center and front differentials, and it is connected as an input shaft to the front differential in case the differential gear unit A is used as the center and rear differentials.

Within the housing 1, at least one pair of planetary gears 3A, 3B are mounted, but three or four pairs of planetary gears 3A, 3B are generally preferred. The differential gear unit A of this embodiment includes three pairs of planetary gears 3A, 3B. Each of the paired planetary gears 3A, 3B includes a long gear portion (first gear portion) 31, a short gear portion (second gear portion) 32, and a neck portion 33 which are formed on its one end portion, the other end portion, and its intermediate portion, respectively. The long gear portion 31 of the planetary gear 3A is slightly longer than the combined lengths of the gear portion 2a of the side gear 2A and the short gear portion 32 of the planetary gear 3B. Similarly, the long gear portion 31 of the planetary gear 3B is slightly longer than the combined lengths of the gear portion 2b of the side gear 2B and the short gear portion 32 of the planetary gear 3A. The outside diameter of the neck portion 33 is either equal to or slightly smaller than the diameter of the dedendum circle of the gear portions 31, 32.

The paired planetary gears 3A, 3B are rotatably supported within the housing 1 in parallel relation to the rotational axis L. The planetary gear 3A is arranged such that the long gear portion 31 is located on the side of the side gear 2A, while the other planetary gear 3B is arranged such that the long gear portion 31 is located on the side of the side gear 2B. The neck portions 33 of the paired planetary gears 3A, 3B overlap each other along the rotational axis L.

The long gear portion 31 of the planetary gear 3A is in engagement at its outer portion 31a with the gear portion 2a of the side gear 2A and at its inner portion 31b with the short gear portion 32 of the other planetary gear 3B. The long gear portion 31 of the other planetary gear 3B is in engagement at its outer portion 31a with the gear portion 2b of the side gear 2B and at its inner portion 31b with the short gear portion 32 of the planetary gear 3A. Accordingly, the planetary gears 3A, 3B interconnect the side gears 2A, 2B as a gear train.

The differential gear mechanism C will be described next. The supporting sleeve portion 24 of the side gear 2A is coaxial with the rotational axis L. Between a distal end face of the supporting sleeve portion 24 and the side gear 2B, a spacer 73 is arranged. The spacer 73 correctly positions the side gears 2A, 2B in the direction of the rotational axis L.

A casing 4 is disposed within the supporting sleeve portion 24.

This casing 4 comprises a hollow ball portion 41 and sleeve portions 42 integral with one and the other ends of the ball portion 41. The sleeve portions 42 are located on a straight line passing through the center of the ball portion 41. The casing 4 is arranged such that the axes of the sleeve portions 42 are coaxial with the rotational axis L. One of the sleeve portions 42 extends through the through-hole of the side gear 2A so as to be rotatably supported by a support hole 14 formed in a central portion of the closure member 12 through a bushing 71. The other sleeve portion 42 is rotatably fitted into the through-hole 22 of the side gear 2B through a bushing 72 and rotatably supported by the housing 1 through the side gear 2B.

A support pin 5 extending orthogonal to the rotational axis L is disposed on a central portion of the ball portion 41 of the casing 4. Opposite end portions of the support pin 5 extend through the ball portion 41 so as to be connected to the supporting sleeve portion 24. Accordingly, the support pin 5 and the casing 4 are rotatable in unison with the side gear 2A.

Two pairs of bevel gears 6A, 6B; 6C, 6D are arranged within the casing 4. The paired bevel gears 6A, 6B are rotatably supported on one and the other ends of the support pin 5, respectively. The other paired bevel gears 6C, 6D are rotatably arranged such that the axes thereof are coaxial with the rotational axis L. The paired bevel gears 6A, 6B are in engagement with the other paired bevel gears 6C, 6D. That is, the bevel gear 6A is in engagement with the bevel gears 6C, 6D; and the bevel gear 6B is also in engagement with the bevel gears 6C, 6D.

Output shafts 61, 62 extend along the rotational axis L from rear surface portions of the bevel gears 6C, 6D, respectively. The output shaft 61 of the bevel gear 6C extends outwardly through the sleeve portion 42 and the support hole 14. In the case where the differential gear unit A is used as a center and a front differential, the output shaft 61 is connected to one of the front wheels. In the case where the differential gear unit A is used as a center and a rear differential, the output shaft 61 is connected to one of the rear wheels. The output shaft 62 of the bevel gear 6D extends outwardly through the output sleeve portion 23 and connects to the other front or rear wheel.

In the parallel-axis combination differential gear unit A thus constructed, the gear portions 2a, 2b of the side gears 2A, 2B are in engagement with the outer portions 31a of the long gear portions 31, i.e., the gear portions 2a, 2b of the side gears 2A, 2B are in engagement with those areas of the long gear portions 31 which are located outwardly of the inner portions 31b with which the short gear portions 32 are in engagement. By virtue of this arrangement, the distance between the side gear 2A and the other side gear 2B can be increased without increasing the length dimension of the neck portions 33. As a result, it becomes possible that the ball portion 41 of the casing 4 is received between the side gear 2A and the other side gear 2B, and the differential gear mechanism portion C is built in the parallel-axis combination gear unit A so that a single differential gear unit A serves as a center and a front differential or a center and a rear differential.

In case the parallel-axis differential gear unit A is used as a center and a front differential, when the housing 1 is driven for rotation, the drive force of the engine is transmitted to the front wheels through the output shafts 61, 62 and further to the rear differential through the output sleeve portion 23. When the average speed of rotation of the front wheels is different from the average speed of rotation of the rear wheels, torque is transmitted from the high-speed rotation side to the low-speed rotation side in accordance with a predetermined torque bias ratio. This is also applicable to the case where the differential gear unit A is used as a center and a rear differential.

Another embodiment of the first version of the invention will be described next. Only those parts of the next embodiment that differ from the prior embodiment or the known parallel-axis combination differential gear unit are described.

Figure 2:
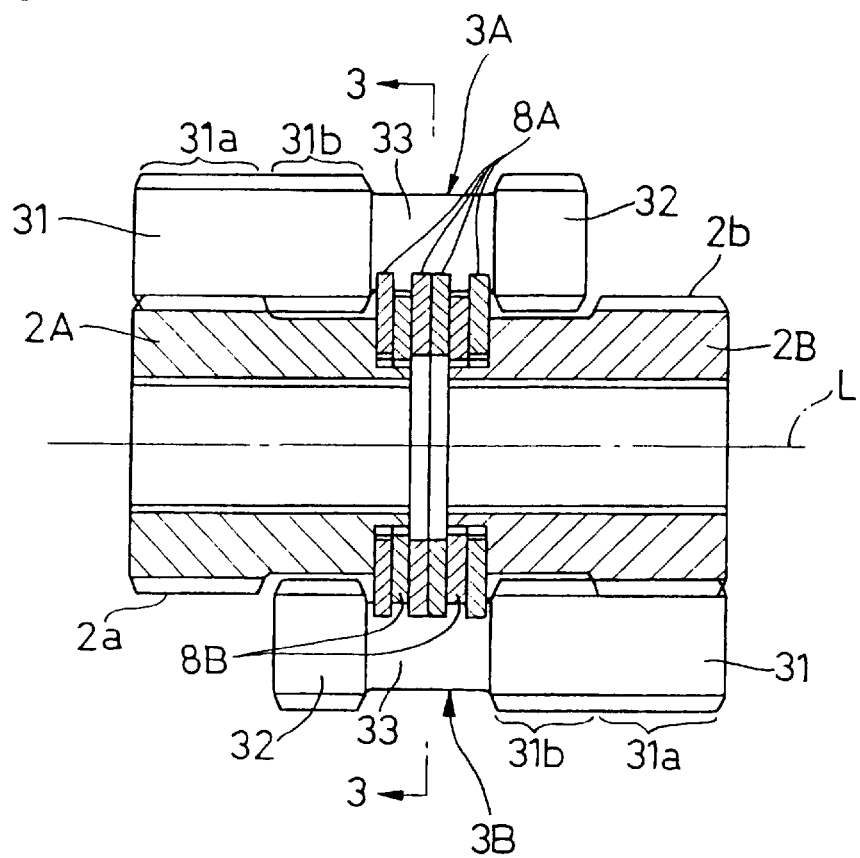
FIG. 2 is a sectional view showing a differential gear mechanism of a second embodiment of the first version.
Figure 3:
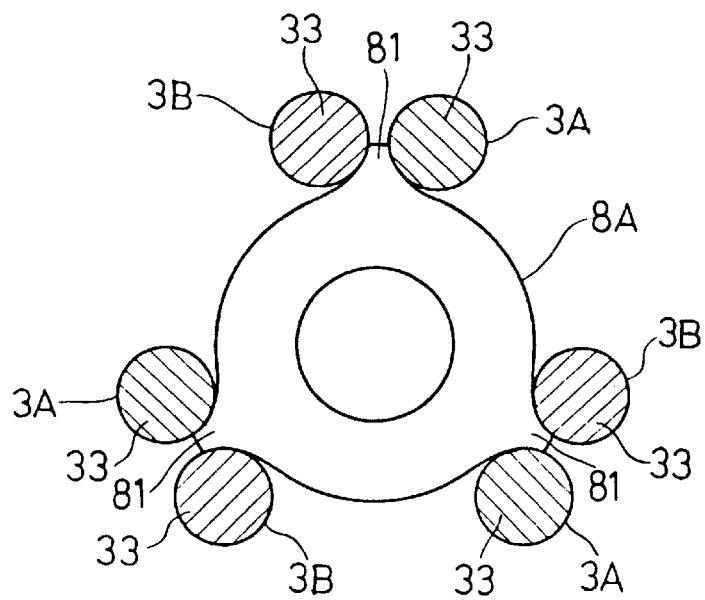
FIG. 3 is a sectional view taken on line 3—3 of FIG. 2.

FIGS. 2 and 3 illustrate the second embodiment of the first version of the invention. In this second embodiment, a plurality of circular friction plates 8A, 8B called "center washers" is arranged in an enlarged space between one pair of side gears 2A, 2B. The friction plates 8A are able to rotate in unison with the housing 1 with projections 81 formed on their outer peripheral surfaces and inserted between adjacent neck portions 33 of the planetary gears 3A, 3B. The other friction plates 8B are disposed between the friction plates 8A and coupled for rotation with one or the other of the side gears 2A, 2B. Accordingly, when the side gears 2A, 2B rotate relative to the housing 1, frictional resistance occurs between the friction plates 8A and the side gears 2A, 2B and between the friction plates 8A, 8B themselves, whereby a larger torque bias ratio can be obtained.

Figure 4:
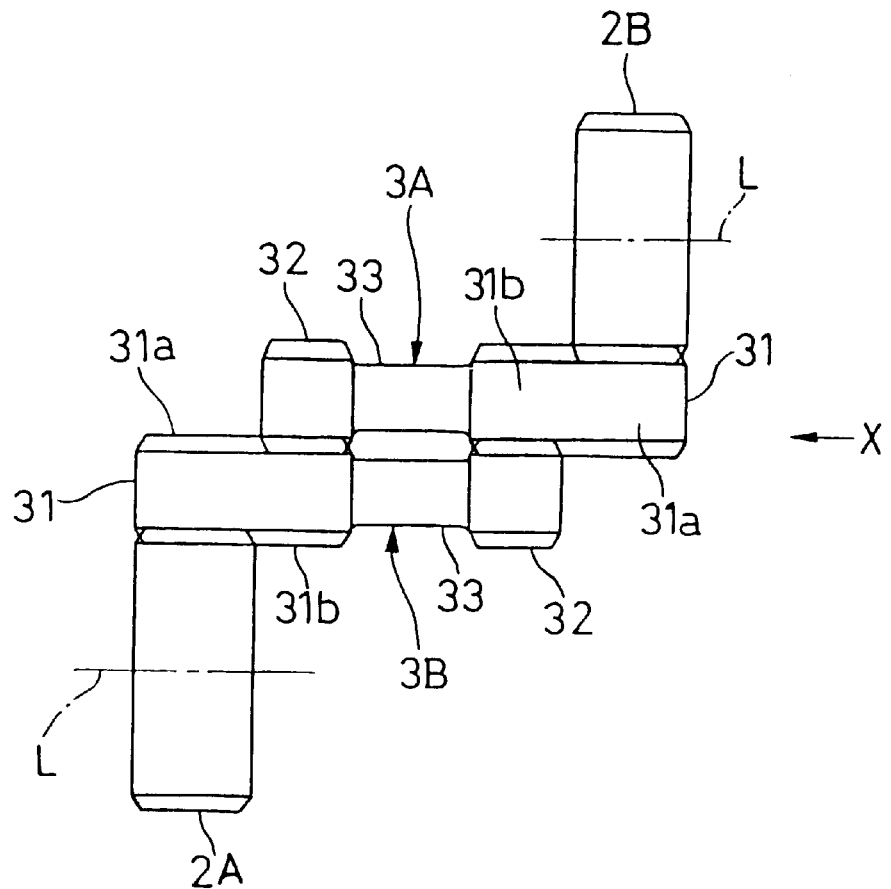
FIG. 4 is a view showing a differential gear mechanism of a third embodiment of the first version.
Figure 5:
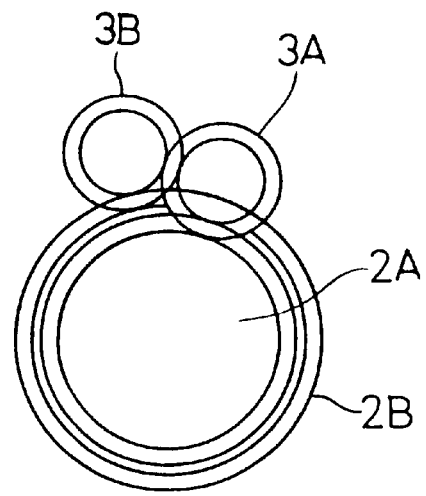
FIG. 5 is a view when viewed in a direction as indicated by an arrow X of FIG. 4.

FIGS. 4 and 5 illustrate the third embodiment of the first version of the invention. In this third embodiment, the side gears 2A, 2B differ in number of teeth, helix angle, amount of addendum modification, etc. so that they have different outside diameters. It should be noted that although the outside diameter of the side gear 2A is larger than the outside diameter of the other side gear 2B in this embodiment, the outside diameter of the former can be larger than that of the latter. By designing the paired side gears 2A, 2B to have mutually different outside diameters, torque transmitted from the housing 1 to the two side gears 2A, 2B can be distributed unevenly between the side gears 2A, 2B.

In FIG. 4, only for the sake of convenience of illustration and explanation, the rotational axis L is divided into two parallel lines and the pair of side gears 2A, 2B is shown on the parallel lines, respectively. The same is applicable to FIGS. 7 and 8.

Figure 6:
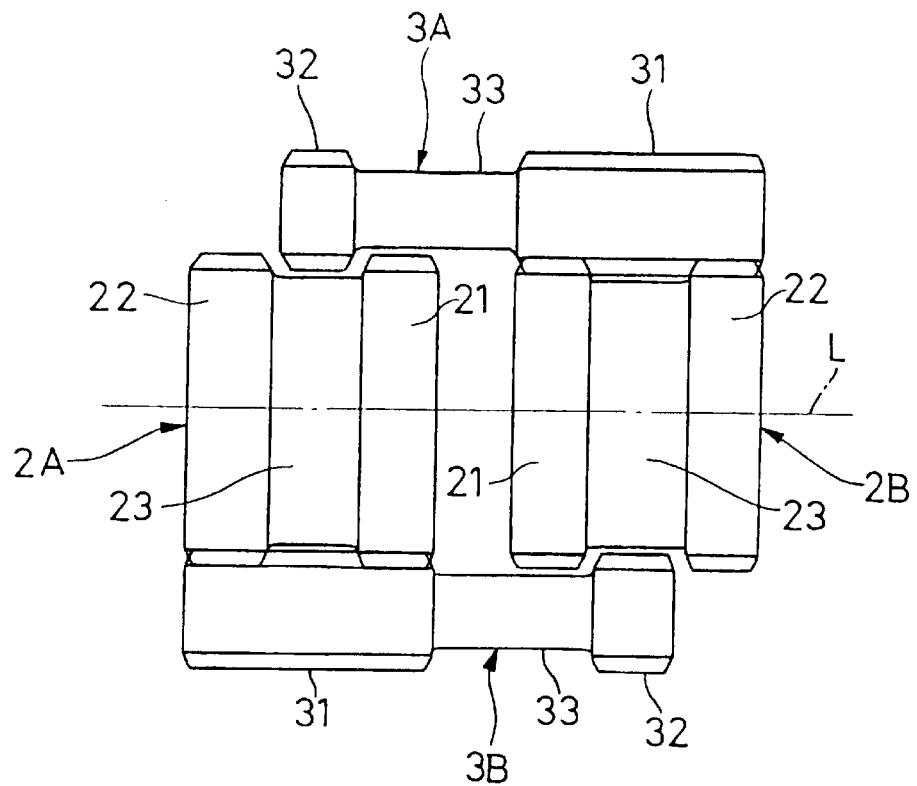
FIG. 6 is a view showing a differential gear mechanism of the fourth embodiment of the first version.

FIG. 6 illustrates the fourth embodiment of the first version of the invention. In this fourth embodiment, the side gear 2A comprises (a) an inner gear portion 21 formed on an end portion adjacent to the side gear 3B well inside the housing (not shown), (b) an outer gear portion 22 formed on an end portion adjacent to the outer side of a housing, and (c) a reduced diameter intermediate portion having a diameter smaller than the diameters of the dedendum circles of the gear portions 21, 22 and located between the two end portions. The inner gear portion 21 and the outer gear portion 22 of the side gear 2A are in engagement with the long gear portion 31 of the planetary gear 3A at opposite end portions thereof. The other side gear 2B likewise comprises an inner gear portion 21, an outer gear portion 22, and a reduced diameter portion 23. The inner gear portion 21 and the outer gear portion 22 are in engagement with the long gear portion 31 of the planetary gear 3B at opposite end portions thereof. The short gear portions 32 of the planetary gears 3A, 3B are in an engagement with the long gear portions 31 of the paired planetary gears 3B, 3A at an intermediate portion thereof. In this engaging state, the short gear portions 32 are faced with the side gears 2A, 2B at intermediate portions thereof. However, since the reduced diameter portion 23 is formed on the intermediate portion of the side gears 2A, 2B, the short gear portions 32 never interfere with the side gears 2A, 2B.

In this fourth embodiment, the distance between the side gears 2A, 2B can be increased to the extent that the outer gear portion 22 is in engagement with the longer portion 31 at an area located outwardly of the engaging portion between the short gear portion 32 and the long gear portion 31. This arrangement compares favorably in strength to the case where the inner and outer gear portions 21, 22 continuous with each other are in engagement with the long gear portion 31 at an area inwardly of the engaging portion between the short gear portion 32 and the long gear portion 31.

Figure 7:
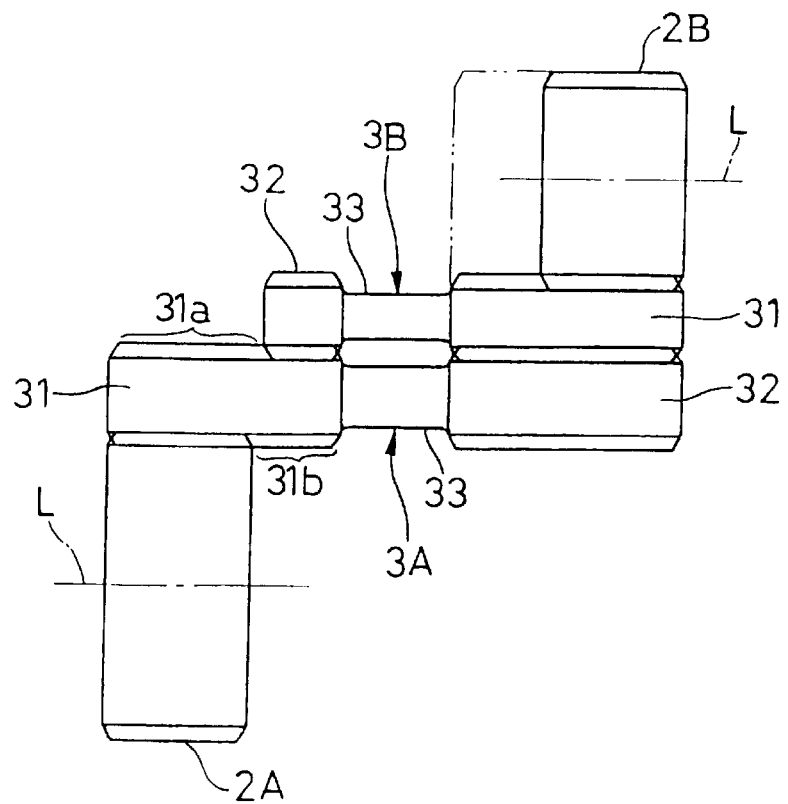
FIG. 7 is a view showing a differential gear mechanism of one embodiment of the second version of the invention.

FIG. 7 illustrates one embodiment of the second version of the invention. In this embodiment, the side gears 2A, 2B are different in the number of teeth, helix angle, amount of addendum modification, etc. By virtue of this arrangement, the side gears 2A, 2B are mutually different in outside diameter. In this embodiment, the side gear 2B is smaller in diameter than the other side gear 2A and the same or smaller in diameter than the diameter of the dedendum circle of the side gear 2A. A second gear portion 32 having the same length dimension as the long gear portion (first gear portion) 31 of the planetary gear 3B, instead of the short gear portion 32 of the above embodiment, is formed on the planetary gear 3A.

The larger diameter side gear 2A is in engagement with the long gear portion (first gear portion) 31 of the planetary gear 3A at an outer portion 31a thereof; while the smaller diameter side gear 2B is in engagement with the long gear portion 31 of the planetary gear 3B on an outer end portion thereof. The short gear portion (second gear portion) 32 of the planetary gear 3B is in engagement with an inner portion 31b of the long gear portion 31 of the planetary gear 3A. The long gear portion 31 of the planetary gear 3A and the short gear portion 32 of the planetary gear 3B are in engagement with each other over their entire face widths.

It should be noted that the diameter of the side gear 2A can be smaller than that of the dedendum circle of the side gear 2B, and the second gear portion 32 of the planetary gear 3A can be the same in length dimension as the long gear portion 31 of the planetary gear 3B. As indicated by an imaginary line in FIG. 7, the side gear 2B can be in engagement with the long gear portion 31 of the planetary gear 3B over their entire face widths.

Figure 8:
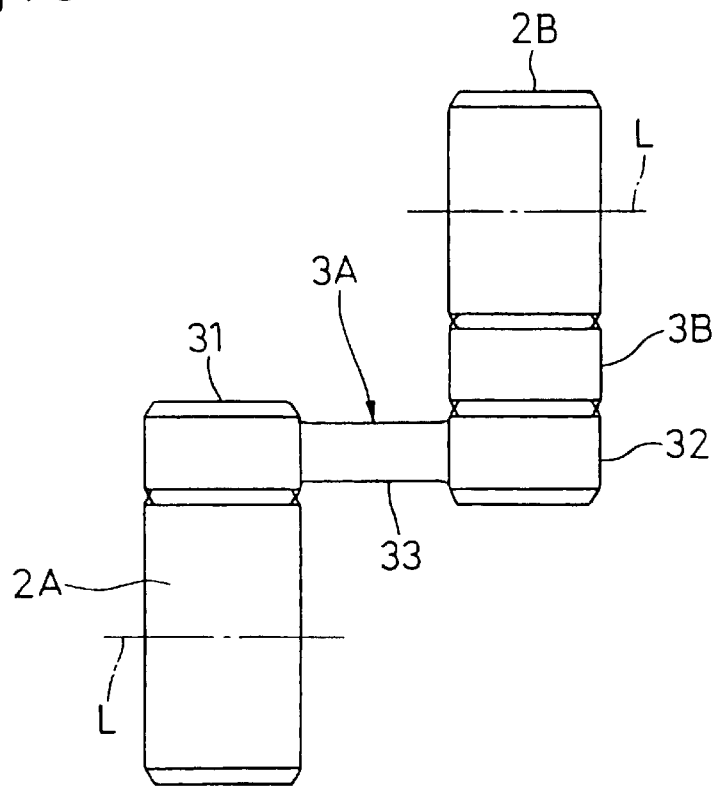
FIG. 8 is a view showing a differential gear mechanism of one embodiment of the third version of the invention.
Figure 9:
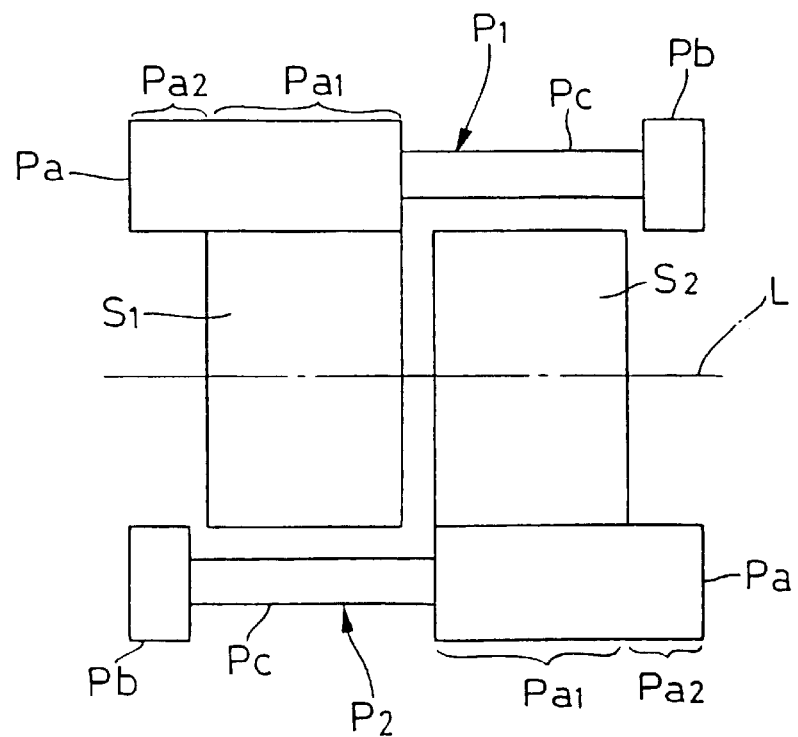
FIG. 9 is a view showing a differential gear mechanism of a conventional parallel-axis combination differential gear unit.

FIG. 8 shows one embodiment of the third version of this invention. In this embodiment, the outside diameter of the side gear 2B is equal to or smaller than the diameter of the dedendum circle of the side gear 2A. Of course, the reverse arrangement is acceptable. A first and a second gear portion 31, 32 are formed on opposite end portions of the planetary gear 3A and a neck portion 33 having an outside diameter equal to or smaller than the diameter of the dedendum circle of the first and second gear portions. The other planetary gear 3B has a single gear portion only and includes no neck portion or other gear portions. It is also accepted that the planetary gear 3A could have a single gear portion and the planetary gear 3B could have first and second gear portions and a neck portion.

The larger diameter side gear 2A is in engagement with the gear portion 31 of the planetary gear 3A over their entire face widths. The smaller diameter side gear 2B is in engagement with the planetary gear 3B over their entire face widths. The second gear portion 32 of the planetary gear 3A and the planetary gear 3B are in engagement with each other over their entire face widths.

What is claimed is:

1. A parallel-axis combination differential gear unit comprising:

a housing driven for rotation about a rotational axis;

a pair of side gears rotatably supported by said housing with axes thereof aligned with each other and coaxial with the rotational axis;

at least one pair of planetary gears rotatably supported by said housing in parallel relation to the rotational axis;

each of said planetary gears being provided on opposite ends thereof with a first and a second gear portion and on an intermediate portion thereof with a neck portion that is smaller in diameter than the said first and second gear portions;

each of said side gears having a gear portion;

said first gear portion of each planetary gear being in engagement with the gear portion of one of said pair of side gears and also with said second gear portion of the other planetary gear;

said gear portions of the side gears being at least partly in engagement with said first gear portions along axial regions thereof located outwardly of an engaging region between said first and second gear portions of the planetary gears; and said neck portion of each planetary gear partly overlapping each other along the rotational axis.

2. The parallel-axis combination differential gear unit of claim 1 in which said gear portions of each side gear are entirely in engagement with said first gear portion along axial regions thereof located outwardly of the engaging region between said first and second gear portions of the planetary gears.

3. The parallel-axis combination differential gear unit of claim 1 in which:

said second gear portion of each planetary gear is in engagement at an intermediate portion thereof with said first gear portion of the other planetary gear;

each of said side gears includes an inner gear portion and an outer gear portion on opposite end portions thereof;

said inner gear portion is in engagement with said first gear portion along a region located inwardly of an engaging portion between said second gear portion and said first gear portion; and said outer gear portion is in engagement with said second gear portion along a region located outwardly of the engaging portion between said first and second gear portions of the planetary gears.

4. The parallel-axis combination differential gear unit of claim 1 in which said side gears of the pair have different outside diameters.

5. The parallel-axis combination differential gear unit comprising:

a housing driven for rotation about a rotational axis;

a pair of side gears rotatably supported by said housing with axes thereof aligned with each other and coaxial with the rotational axis;

at least one pair of planetary gears rotatably supported by said housing in parallel relation to the rotational axis;

each of said planetary gears being provided on opposite ends thereof with a first and a second gear portion and on an intermediate portion thereof with a neck portion that is smaller in diameter than said first and second gear portions;

said first gear portion of each planetary gear being in engagement with one of said side gears and also with said second gear portion of the other planetary gear;

said gear portions of the side gears being at least partly in engagement with said first gear portions along axial regions thereof located outwardly of an engaging region between said first and second gear portions of the planetary gears; and said neck portion of each planetary gear entirely overlapping each other along the rotational axis.

6. The parallel-axis combination differential gear unit of claim 5 in which:

said side gears of the pair have different outside diameters, one of said side gears having a larger outside diameter and the other of said side gears having a smaller outside diameter; and said first gear portion of one of said paired planetary gears is in engagement with said second gear portion of the other planetary gear at an inner end portion thereof and also with said larger diameter side gear at an outer end portion that is located outwardly of said inner end portion.

7. The parallel-axis combination differential gear unit of claim 5 in which said smaller diameter side gear of said paired side gears is in engagement with said first gear portion of the other planetary gear at the outer portion.

* * * * *